March 16, 1937.  R. D. BROUWER  2,073,957
BEARING MOUNTING
Filed Oct. 4, 1934

INVENTOR:
RODGER D. BROUWER,
BY
HIS ATTORNEY.

Patented Mar. 16, 1937

2,073,957

UNITED STATES PATENT OFFICE 2,073,957

BEARING MOUNTING

Rodger D. Brouwer, Bristol, Conn., assignor to General Motors Corporation, Detroit, Mich., a corporation of Delaware Application October 4, 1934, Serial No. 746,855

12 Claims. (Cl. 308—236)

This invention relates to bearing mountings and comprises all of the features of novelty herein disclosed. An object of the invention is to provide improved means for preventing relative rotation between telescoping parts such as a supporting shaft and an antifriction bearing. Another object is to provide improved means for facilitating the assembly of a socketed member on a support and holding the assembled parts from relative movement of rotation. Another object is to provide a simple retaining element applicable more especially to a ball and socket joint to permit tilting adjustment and easy assembly while preventing rotation of the parts.

To these ends and also to improve generally upon devices of this character, the invention consists in the various matters hereinafter described and claimed. In its broader aspects, the invention is not necessarily limited to the specific construction selected for illustrative purposes in the accompanying drawing in which:

Figure 1:
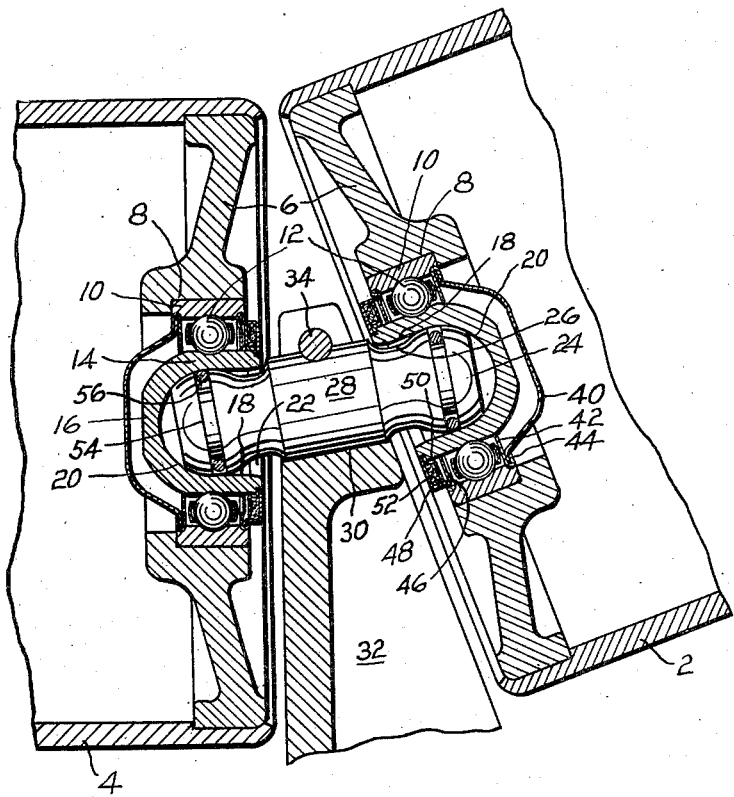
Fig. 1 is a longitudinal sectional view of a portion of a conveyer roll mounting.

The invention is illustrated as embodied in a troughing idler roll structure for a conveyer belt, a portion of one of the inclined rolls being indicated at 2 and the adjacent end of the middle or horizontal roll being indicated at 4. The ends of the rolls have caps or heads 6 provided with shouldered seats 8 for outer race rings 10 of antifriction bearings. Rolling elements 12, preferably balls, engage a groove in each race ring 10 and in a companion inner race ring 14, the latter being shown as a cupped or socketed structure with an integral end wall 16. Each socket preferably has an inner cylindrical surface 18 merging at one end with a spherical zone 20, the other end meeting a conical or flaring surface 22 to pilot the socket during assembly upon a co-operating support herein shown as a ball or spherical segment 24. Each ball or segment is joined by a necked down clearance portion 26 to a shaft or pin 28, the latter preferably being of a diameter at least as large as the ball. The shaft is passed endwise through a bored hole 30 in a bracket or standard 32, the bracket being split at the top to provide yieldable jaws to clamp the shaft. A clamping bolt 34 is passed through the jaws and through a notch or groove in the shaft, thus locking the shaft against endwise movement and rotation.

The space between the bearing rings is closed by any suitable guards or seals. One is shown as a disc 40 spaced from the wall 16 to provide a large lubricant reservoir. A washer 42 engages a groove in the outer race ring and has a terminal flap 44 bent over the outer edge of the disc 40 to hold it. At the other side of the row of balls, the race rings are sealed by a plurality of washers comprising an inner wall 46 and an outer wall 48 connected together and attached to the outer race ring. An angle washer 50 is attached to the inner race ring between the walls 46 and 48 and in the angle is placed a packing or sealing ring 52, preferably of felt. It is the frictional rubbing of the felt upon the angle washer, as well as the rolling of the loaded balls, which tends to cause the socketed member to turn on the ball. The foregoing is not per se my invention except as the structure may co-operate with what is hereinafter described.

Figure 2:
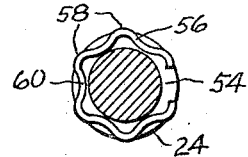
Fig. 2 is a cross sectional view of a ball support.
Figure 3:
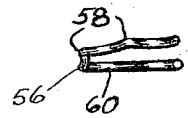
Fig. 3 is an end view of a spring retainer.

Around an equatorial zone of the ball or segment 24, preferably at right angles to the axis of the shaft, is formed a groove 54 to receive a split ring or spring wire 56 of wavy form. When the wire is unconfined externally by the socket, its inherent resiliency projects the crests 58 of the undulations or waves a little beyond the ball surface as in Fig. 2, the troughs 60 of the waves, or most of them clearing the bottom of the groove. In other words, the undulations are inherently a little deeper than the depth of the groove. When the socket is forced over the ball, the spring is compressed and some or all of the troughs engage the bottom of the groove depending on the tilting adjustment of the socket. The wire also has a lateral resiliency tending to make it assume the form indicated in Fig. 3, that is, it will exert pressure against the side walls of its groove. This side pressure will aid in keeping the spring from turning in the groove, there being many positions of tilting adjustment of the socket on the ball wherein the external crests 58 are not all confined and engaged by the spherical surface 20 of the socket but some are in opposition to the cylindrical surface 18, as at the low points in Fig. 1. At such points, of course, the cylindrical surface becomes spaced from the ball surface and from the groove while the spring tends to expand at such space thereby making some of the crests and troughs clear both the socket and the ball or exert little pressure upon them. The side friction then becomes important in preventing the spring itself from turning.

In assembling the socket on the ball, with the spring circumferentially expanded in its groove and laterally contracted by the side walls of the groove, the socket is pushed over the ball, the conical or flaring surface 22 acting as a pilot and also camming the spring wire into its circumferentially contracted position. In such position, the spring will not turn in its groove, and its expansive pressure against the spherical surface of the socket will hold the latter from rotation. The socket however can be easily forced to the required tilted position so that any companion socket at the other end of the conveyer roll will fit its socket also.

I claim:

1. In a device of the character described, a pair of members tiltably engaging one another, one of said members having a groove, a wavy spring in the groove and having undulations deeper than the groove, some of the undulations pressing yieldingly against the bottom of the groove and some pressing yieldingly against the other member; substantially as described.

2. In a device of the character described, a pair of members tiltably engaging one another, one of said members having a groove, a spring in the groove and having inherent tendency to press laterally against the sides of the groove, and the spring also having portions with inherent tendency to project beyond the groove to frictionally engage the other member; substantially as described.

3. In a device of the character described, a pair of members engaging one another and comprising a spherical segment and a socket, one of said members having a groove next to the other member, a spring in the groove, and the spring being constructed and arranged to exert pressure both laterally on the side walls of the groove and on said other member; substantially as described.

4. In a device of the character described, a pair of members engaging one another and comprising a spherical segment and a race ring rockably mounted on the segment, the spherical segment having a groove, and a wavy friction spring in the groove and pressing against the side walls of the groove and against the race ring; substantialy as described.

5. In a device of the character described, a member having an arcuate surface, a member having a cylindrical surface tiltably engaging the arcuate surface, one of the engaging members having a groove, and a wavy friction spring in the groove and pressing against the side walls of the groove and against the other engaging member; substantially as described.

6. In a device of the character described, a ball having a groove, an antifriction bearing having its inner race ring sleeved over the ball, one end of the race ring having a flaring surface, and a resilient member adapted to be cammed into the groove by the flaring surface; substantially as described.

7. In a device of the character described, a pair of members engaging one another, one of the members comprising a race ring having rolling elements on one side and a cylindrical surface on the other, the other member comprising a spherical segment engaging the cylindrical surface of the race ring, the segment having a groove around it, and a wavy friction spring in the groove for resisting rotation of the race ring on the segment; substantially as described.

8. In a device of the character described, a wire of generally arcuate form and having resilient undulations peripherally disposed, and the wire having inherent resiliency tending to laterally deflect one portion from the plane of the remaining portion; substantially as described.

9. In a device of the character described, a member having a spherical zone, a socket member having a cylindrical surface rockably engaging said spherical zone, one of the members having a groove, a spring in the groove and having undulations peripherally disposed, some of the undulations pressing against the bottom of the groove and some engaging the opposing member in any position of rocking adjustment, and the spring also having inherent tendency to expand laterally to press against the side walls of the groove; substantially as described.

10. In a device of the character described, a member having a spherical zone, a socket member having a spherical surface and a cylindrical surface rockably engaging said spherical zone, one of the members having a groove in a plane through the center of curvature of the spherical surface, a friction spring in the groove and having undulations peripherally disposed and of a depth greater than the depth of the groove, some of the undulations pressing against the bottom of the groove and some engaging the opposing member in any position of rocking adjustment, and the spring having a portion with inherent tendency to offset itself laterally from the remaining portion whereby the spring also presses yieldingly against the side walls of the groove; substantially as described.

11. In a device of the character described, a pair of members telescoping with one another, one of the members having a groove, a spring in the groove and having undulations peripherally disposed and of a depth greater than the depth of the groove, some of the undulations thereby pressing peripherally against one of the members and some against the other member, and the spring having a portion with inherent tendency to offset itself laterally from the remaining portion whereby the spring also presses yieldingly against the side walls of the groove; substantially as described.

12. In a device of the character described, a pair of telescoping members, at least one of the members having a peripheral groove open to the other member, and a spring unconnected to either member and disposed in the groove, the spring having such tension and configuration that portions thereof yieldingly and frictionally bear against both the grooved member and the opposing member; substantially as described.

RODGER D. BROUWER.